United States Patent
Gale et al.

[15] 3,653,437
[45] Apr. 4, 1972

[54] VISCOUS SURFACTANT WATERFLOODING

[72] Inventors: Walter W. Gale; Milton O. Denekas, both of Houston, Tex.; Stanley J. Storfer, Edison, N.J.

[73] Assignee: Esso Production Research Company

[22] Filed: May 25, 1970

[21] Appl. No.: 40,240

[52] U.S. Cl. ............................166/252, 166/273, 166/274, 166/275
[51] Int. Cl. .......................................................E21b 43/22
[58] Field of Search ..................166/270, 273–275; 252/8.55 D

[56] References Cited

UNITED STATES PATENTS

| 3,302,713 | 2/1967 | Ahearn et al. | 166/275 X |
| 3,348,611 | 10/1967 | Reisberg | 166/275 |
| 3,491,834 | 1/1970 | Ahearn et al. | 166/273 |
| 3,500,918 | 3/1970 | Holm | 166/273 |
| 3,512,586 | 5/1970 | Holm | 166/273 |

*Primary Examiner*—Stephen J. Novosad
*Attorney*—James A. Reilly, John B. Davidson, Lewis H. Eatherton, James E. Gilchrist, Robert L. Graham and James E. Reed

[57] ABSTRACT

A method of recovering oil from a subterranean formation using an aqueous surfactant solution with a predetermined and controlled viscosity. The ability of the surfactant to impart viscosity to the aqueous solution is dependent upon the ratio of water-insoluble/pentane-insoluble sulfonates. This ratio must be maintained within the range of 0.01 to 0.30 to produce a surfactant with desirable oil-recovery properties. The ratio can be maintained within this range and varied in value to change the viscosity-imparting properties of the surfactant by adjusting the process reaction conditions.

10 Claims, 1 Drawing Figure

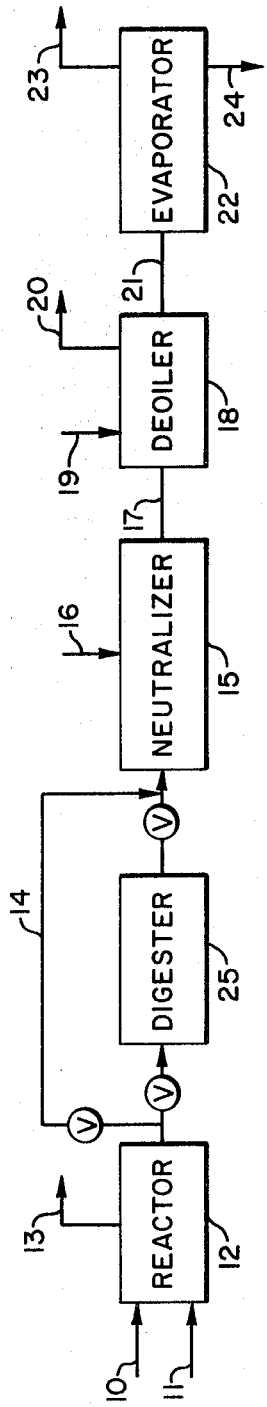

VISCOUS SURFACTANT WATERFLOODING

BACKGROUND OF THE INVENTION

1. Field of the invention.

This invention relates to a process for recovering oil from a subterranean formation. The invention also relates to a method for controlling the viscosity of an aqueous solution used to recover oil from a subterranean formation. This invention further relates to a method of manufacturing surfactants having predetermined viscosity-imparting properties.

2. Description of the Prior Art.

The petroleum industry has recognized for many years that only a portion of the original oil in place in an oil reservoir can be produced by natural mechanisms. It is also well known that conventional methods of supplementing natural recovery are relatively inefficient. Typically, a reservoir may retain half its original oil even after the application of currently available methods of secondary recovery. Accordingly, there is a continuing need for improved recovery methods which will substantially increase the ultimate yield of petroleum from subterranean reservoirs.

Waterflooding is by far the most economical and widely practiced of secondary recovery methods. In such a process, water is introduced through injection wells to drive oil through the formation and to offset producing wells. Much of the current work in secondary recovery technology has been directed toward improving the efficiency of waterflooding processes.

Surface active agents or surfactants are one class of materials which have been proposed for improving the efficiency of waterflooding processes. Much of the oil that is retained in the reservoir after a typical waterflood is in the form of discontinuous globules or discrete droplets which are trapped within the pore spaces of the reservoir. It has been suggested that, because the normal interfacial tension between the reservoir oil and water is so high, these discrete droplets are unable to sufficiently deform to pass through narrow constrictions in the pore channels. When surface active agents are added to the flooding water, they lower the interfacial tension between the water and the reservoir oil and permit the oil droplets to deform and flow with the flood water. It is generally conceded that the interfacial tension between the flood water and the reservoir oil must be reduced to less than 0.1 dyne/cm. for effective recovery.

While conventional waterflooding and surfactant waterflooding may be effective in obtaining additional oil from subterranean oil reservoirs, these processes have a number of shortcomings which reduce their ability to recover oil. Foremost among these shortcomings is the tendency of the injected fluid to finger through the reservoir and to bypass substantial portions of oil. In other words, as the injected fluid travels through the reservoir between injection wells and production wells, it contacts less than the total volume of the reservoir within the injection well-production well pattern. The fraction of the volume of the reservoir that is swept by injected fluid is termed the "sweep efficiency" and is expressed as a percentage of the total reservoir volume in the pattern. The sweep efficiency of a typical conventional waterflood or surfactant waterflood may typically be less than 75 percent when the flooding operation reaches its economic limit. Thus, one quarter or more of the reservoir may not have been contacted by the injected fluid at the end of the operation. The low sweep efficiency of these operations is usually explained by the fact that the injected fluid has the ability to move through the reservoir at a much faster rate than the oil which it is displacing. The fingering and bypassing tendencies of the injected fluid are due in part to its relatively low viscosity.

The sweep efficiency of a flooding operation is dependent in part on the mobility ratio of the flooding system. The mobility ratio is a mathematical expression which relates fluid and formation rock properties and which expresses the relative mobilities of the oil and of the driving water in a flooding operation. When the mobility ratio equation is applied to a typical waterflooding operation it is expressed as:

$$(M_o/M_w) = (\mu_w/\mu_o) = (K_o/K_w)$$

where $M_o$ = mobility of the oil in the reservoir in question;
$M_w$ = mobility of the driving water in the reservoir in question;
$\mu_w$ = viscosity of the driving water;
$\mu_o$ = viscosity of the oil;
$K_o$ = relative permeability of the reservoir to the oil in the presence of residual water;
$K_w$ = relative permeability of the reservoir to water in the presence of residual oil;

This equation is perhaps best explained by stating that when the mobility ratio of oil to water is equal to one the oil and the water will move through the reservoir with equal ease. When the mobility ratio is less than one there will be a tendency for the water to bypass the oil and finger to the producing well. Naturally, when the mobility ratio is low the sweep efficiency will also be low.

The mobility ratio is related to the viscosities of the flooding fluid and the reservoir oil. The viscosities of reservoir crude oils can vary considerably. Some crudes might have viscosities as low as one or two centipoises and others range up to a thousand centipoises or even greater. However, the vast majority of reservoir crude oils which are capable of being recovered by conventional or surfactant waterflooding have viscosities in the range of 2 to 10 centipoises at reservoir temperature and pressure. It should be readily apparent from the mobility ratio equation that, if a surfactant waterflood with a viscosity of approximately 1 centipoise is used to displace oil having a viscosity of 5 centipoises, there will be a tendency for the flood water to finger through the reservoir oil. This, of course, will result in a relatively poor sweep efficiency and a considerable portion of the reservoir oil may never be contacted by the surfactant flood water. It has in fact generally been noted that surfactant water-flooding performs less satisfactorily with viscous crude oils than with relatively non-viscous oil.

A number of procedures have been suggested to date for improving conventional and surfactant waterflooding to reduce the degree of fingering and bypassing and to increase the sweep efficiency. One suggestion has been to increase the viscosity of the flood water by incorporating water-insoluble, viscosity-imparting agents in the water. Materials that have been suggested for this purpose include a wide variety of gums, sugars, polymers and certain sulfonated hydrocarbons. While these materials are effective to an extent in increasing the viscosity of flood water they are also characterized by serious disadvantages. For example, some of the materials have a tendency to plug formations; some are relatively unstable; some have relatively little thickening effect; and none of the materials has the ability to lower the interfacial tension between the oil and water to desired levels. Additionally, many of these materials are quite expensive and their use is not feasible from the standpoint of economics.

A recent U.S. patent application "Viscous Surfactant Waterflooding," Hopkins, Lederman, and Murray; (Ser. No. 148,127, filed May 28, 1971; a continuation of Ser. No. 845,126, filed July 23, 1969; now abandoned) describes a new surfactant composition which has the dual ability of increasing the viscosity of the flood water and of radically lowering the interfacial tension between the reservoir oil and flood water. These dual purpose surfactant compositions are effective oil recovery agents. They are inexpensive, they lower the interfacial tension to desirable levels and they substantially increase the viscosity of the flood water. However, there is a need for means of controlling the viscosity of solutions of these surfactants while retaining a low interfacial tension. The viscosity of such solutions may be higher or lower than the value desired for particular application.

Generally speaking, an increase in the viscosity of the surfactant flood water will improve oil recovery. However, an increase to a particular desired level can be vitally important to the efficiency of the recovery. In other words, an increase in the viscosity of the flood water may be beneficial, but unless this increase is brought within the desired limits the recovery process cannot be conducted under optimum conditions. Where the increased viscosity is still too low there will be a tendency for that fluid to finger through the oil and to inefficiently sweep the reservoir. Where the increased viscosity is too high, excessive energy will be used in displacing the surfactant solution through the reservoir. Moreover, where the viscosity of the surfactant solution is higher than that of the fluid which displaces it, e.g., flood water, there will be a tendency for viscous fingering to occur at the trailing edge of the surfactant solution bank. Control of the viscosity level is therefore of paramount importance to an efficient displacement of reservoir oil.

SUMMARY OF THE INVENTION

This invention relates to a method of recovering oil from an oil-bearing formation. A surfactant composition is prepared by sulfonating hydrocarbons occurring in a 700°–1,100° F. boiling range fraction of a petroleum crude with gaseous $SO_3$, preferably, in a thin film reactor. The process reaction conditions are adjusted to produce a surfactant having a water-insoluble/pentane-insoluble ratio which is within the range of 0.01 to 0.30 and having predetermined viscosity-imparting properties. Reaction conditions which can be adjusted to vary the ratio include the reactor temperature, the treat ratio and the digestion of unreacted gaseous $SO_3$.

A primary object of this invention is to improve waterflooding processes for recovering oil from a formation. Another object of this invention is to improve the sweep efficiency of a waterflood process for recovering oil. Another object of this invention is to provide a process for manufacturing a surfactant to be employed in a waterflood process for the recovery of oil which has a water-insoluble/pentane-insoluble ratio within the range of 0.01 to 0.30 and which has predetermined viscosity-imparting properties.

These and other objects of this invention will be apparent from the following drawing and discussion of the preferred embodiment.

BRIEF DESCRIPTION OF THE DRAWING

The FIGURE is a schematic flow diagram of a process for manufacturing the surfactants of this invention.

DESCRIPTION OF THE PREFERRED EMBODIMENT

It has been found that the viscosity-imparting properties of the surface active agents of this invention are related to the relative amounts of certain components in the surfactant product. These viscosity-controlling components are the water-insoluble sulfonates and pentane-insoluble sulfonates which will be defined and discussed in greater detail hereinafter. It has further been found that the relative amounts of these constituents can be varied, and thus the viscosity-imparting properties of the surface active agents can be controlled by regulating the process reaction conditions during the manufacture of the product.

Prior to discussing the method of determining the water-insoluble/pentane-insoluble sulfonate ratio, the effect of this ratio on the viscosity of an aqueous solution of the product, and the methods of controlling the value of this ratio within the desired limits, it may be helpful to review the general methods for producing these dual purpose surfactants as disclosed in U.S. patent application Ser. No. 148,127. The method of manufacturing these dual purpose surfactants is set forth in detail in that patent application and that disclosure is incorporated by reference herein. However, for background and convenience a general description of the method of producing such surfactants will be given.

These dual purpose surfactants are prepared by sulfonating certain hydrocarbon feed stocks under specified sulfonating conditions. The preferred source of feed stock hydrocarbons is a 700°–1,100° F. boiling range fraction of a petroleum crude. Such fractions are known generally in the art of petroleum refining as "lube oil distillates" and may be identified by the ASTM Standard Method of Distillation, D 1160–61.

As set forth in patent application Ser. No. 148,127, the feed stocks can be obtained from a variety of sources. The source may be a virgin distillate, an unrefined petroleum crude, or a distillate which has been subjected to further refining steps such as hydrofining, dewaxing, or solvent extraction. All of these feed stocks are satisfactory for producing the dual purpose surfactant so long as they contain at least 10 percent by volume of the sulfonatable constituents present in a 700°–1, 100° F. boiling range fraction of a petroleum crude.

The FIGURE will further illustrate the process of manufacture of these dual purpose surfactants. Turning to this drawing, a suitable petroleum feed stock in line 10 and a sulfonating agent, such as gaseous $SO_3$ and air, in line 11 are introduced into the sulfonation reactor 12 where a portion of the petroleum feed is converted into sulfonic acids. Waste gases containing primarily sulfur dioxide, sulfur trioxide, oxygen and nitrogen are discharged by way of vent line 13. The temperature of the reactor effluent may vary broadly from 150° to 375° F. This reactor temperature will be governed primarily by the viscosity of the feed stock, the reactor design and the desired flow rate of feed stock through the reactor. Generally, reaction temperatures of from about 250° to 325° F. are preferred.

The gaseous sulfur trioxide is introduced into the hydrocarbon feed stock in an inert diluent gas, such as air or nitrogen. Sulfur trioxide will preferably be from about 5 to 8 percent by volume of the total gaseous feed volume. This percentage is not critical, however, and may vary from as low as 0.5 percent up to approximately 25 percent by volume. The diluent gas should be dried before the sulfur trioxide is introduced to prevent reaction between sulfur trioxide and water vapor.

The treat ratio for the process expresses the relationship between the quantity of sulfur trioxide and the quantity of hydrocarbon feed introduced into the reactor and is expressed as the number of pounds of sulfur trioxide per 100 pounds of hydrocarbon feed. This treat ratio may vary between 5 and 30 pounds of $SO_3$ per 100 pounds of hydrocarbon feed stock but preferably is about 20 pounds per hundred.

The average period of time that the sulfonatable material remains in the reactor is termed the "residence time." Short residence times are preferable; approximately 1 second to 5 seconds generally produces superior products. However, the residence time depends primarily on the configuration of the reactor and may vary broadly. In certain instances the residence time may be several minutes without adverse results.

The hydrocarbon feed stream and the gaseous $SO_3$ may be preheated before introduction into the reactor. These increased temperatures will speed the reaction and lower the viscosity of the hydrocarbon feed stock. The preferred feed stocks for producing these dual purpose surfactants are normally maintained at a temperature of from 150° to 210° F.

Thin film reactors are the preferred type of sulfonation reactor to produce these dual purpose surfactants. Such reactors include the "falling film" reactors such as shown in British Pat. No. 1,111,208 and German Pat. No. 1,195,299. Wiped film reactors are another type of this general class and are typified by the reactor disclosed in U.S. Pat. No. 3,427,342. These thin film reactors including the falling film and wiped film types have the common feature of means for producing a very thin film of hydrocarbon liquid within the reaction zone. Gaseous $SO_3$ in the diluent gas passes across this film and induces turbulence in the film to promote rapid reaction and rapid transfer of heat from the interior of the reactor to its exterior.

After the desired degree of sulfonation the reactor effluent is withdrawn by means of line 14 and comprises a mixture of sulfonic acids, unreacted hydrocarbon feed stocks, and minor amounts of unreacted gaseous $SO_3$. The mixture is then introduced into neutralizer 15 where it is neutralized by an aqueous solution of base from line 16. Neutralization of these sulfonic acids is a conventional technique and many bases both organic and inorganic may be employed. The preferred bases for neutralization are ammonia and sodium hydroxide. Generally enough base is added to bring the pH to about 9–11 and neutralization temperatures normally range from 60°–210° F.

The neutralized product is withdrawn by means of line 17 and introduced into the deoiling chamber 18. The removal of unreacted oil from surfactants produced from petroleum feed streams is conventional and a number of deoiling methods may be suitably employed. However, in the practice of this invention a single solvent process is preferred. Isopropyl alcohol is introduced through line 19 in a quantity which is approximately 70 percent of the water in the mixture. The water in the mixture results from the aqueous base solution used in the neutralization step. The total volume of alcohol-water should be approximately equal to or slightly greater than the volume of the other constituents of the mixture. If insufficient water is present to give this equal volume, additional water may be introduced with the alcohol through line 19. The unreacted oil will separate in the deoiling chamber 18 and will be withdrawn through line 20. A second liquid phase containing alcohol-water, sulfonated hydrocarbons, inorganic salts and minor quantities of unreacted oil will be withdrawn through line 21 and discharged into the evaporation stage 22. In the evaporation stage, water and alcohol are removed through line 23 and the dried neutralized crude product is discharged through line 24.

The constituents of this dual purpose surfactant product can be segregated and identified using standard solvent extraction and qualitative analysis techniques. For convenience and clarity, these constituents will be defined herein in terms of this standard solvent extraction process. Any remaining water and alcohol is first removed from the product by drying. The dried product is then placed in a solution of 85 volume percent isopropyl alcohol and 15 volume percent water. A portion of the sample will be soluble in the solution and a portion will be insoluble. The insoluble portion is filtered from the solution and set aside for further analysis. The solution containing the alcohol-water soluble fraction is then dried to remove the alcohol water. The dry residue is then placed in pentane. A portion of this residue is insoluble in pentane and is removed from the solution. Qualitative analysis reveals that this pentane-insoluble constituent is essentially a water-soluble hydrocarbon sulfonate. The pentane-soluble fraction is a hydrocarbon oil having a mass spectrum similar to that of the original feed stock. This fraction appears to be oil which did not react in the sulfonation step.

The fraction of the original sample which is not soluble in the isopropyl alcohol-water solution is then placed in water. A portion is soluble and qualitative analysis reveals that this fraction is essentially inorganic salt, such as $Na_2SO_4$, which was produced by the reaction of excess $SO_3$ and the base during the neutralization step. The constituent which is insoluble in water is essentially a hydrocarbon sulfonate having a relatively high equivalent weight. It should be noted that the water-insoluble sulfonate can be solubilized in water in the presence of the water-soluble, pentane-insoluble sulfonate. Also the unreacted oil which would otherwise be insoluble in water is soluble in the presence of the sulfonated hydrocarbons.

An analysis of a typical dual purpose surfactant in the form of the dried neutralized product is:

TABLE I

Dried Product Composition

| Constituent | Weight Percent |
| --- | --- |
| Pentane-insoluble sulfonate | 68.4 |
| Oil | 14.1 |
| Inorganic salt (sodium sulfate) | 11.0 |
| Water-insoluble sulfonate | 6.5 |
| | Total: 100.0 |

As was previously noted, it has been found that the viscosity-imparting properties of these surfactant compositions is related to the ratio of water-insoluble sulfonates to pentane-insoluble sulfonates in the sulfonation product. Moreover, it has been found that this ratio must be kept within limits to produce a satisfactory product for oil recovery. The ratio should be no lower than 0.01 and should be no higher than 0.30. It appears that the products with low water-insoluble/pentane-insoluble sulfonate ratios below 0.01 may have viscosity-imparting properties which are unsatisfactorily low to efficiently recover oil. The products which have ratios above 0.30 may not be completely soluble in water and their aqueous solutions, therefore, will not satisfactorily recover oil.

To illustrate the relationship between the ratio of water-insoluble/pentane-insoluble sulfonates and the viscosities of the surfactant solutions, a number of products with varying ratios were placed in aqueous solution and their viscosities measured. The pentane-insoluble sulfonates and the water-insoluble sulfonates were approximately 75 percent by weight of the dried product in each of these samples. The remainder was unreacted oil and inorganic salts resulting from the neutralization of the reaction product. Each of these samples including the associated inorganic salts and unreacted oil were added to water containing 1.0 weight percent sodium carbonate. Since it has been found that the efficiency of these products as oil recovery agents is related to the quantity of pentane-insoluble sulfonate present in the sample, the quantity of dried product added to the water was adjusted so that 2.0 weight percent pentane-insoluble sulfonate would be present in each solution. The solutions were vigorously mixed for 1 hour, and then the viscosity of each of these solutions was measured at a shear rate of 230 reciprocal seconds at 25° C. Table II illustrates the relationship between the ratio of water-insoluble/pentane-insoluble sulfonates of a product to the viscosity of a solution of that product.

TABLE II

| Ratio of Water-Insoluble Sulfonates to Pentane-Insoluble Sulfonates in the Product | Viscosity in Centipoises of Surfactant Solution |
| --- | --- |
| 0.003 | 1.8 |
| 0.033 | 2.6 |
| 0.038 | 2.2 |
| 0.087 | 2.7 |
| 0.094 | 3.0 |
| 0.244 | 5.4 |
| 0.348 | Insoluble |

The general relationship of this correlation is apparent. As the ratio increases, the viscosity of a solution of the product also increases. The minor variations in this ratio-viscosity correlation may be due to the difficulty of reproducing the measurements under precisely comparable conditions.

It should be noted at this point that the viscosities tabulated in Table II are apparent viscosities. These solutions have non-Newtonian fluid behavior. They are pseudo-plastic since their apparent viscosity will decrease with an increase in shear rate. They are thixotropic since when sheared at a given rate their apparent viscosities will decrease with time. These properties of pseudo-plasticity and thixotropy also increase as the water-insoluble to pentane-insoluble ratio increases.

It has further been found that the ratio of water-insoluble sulfonates to pentane-insoluble sulfonates can be varied by adjusting the process reaction conditions. Examples of such reaction conditions include the reactor temperature, the treat ratio and the digestion of unreacted gaseous $SO_3$. The ratios and viscosities will increase as these reaction conditions are increased; they will decrease as the reaction conditions are decreased. Thus, by changing such reaction conditions in the manner specified herein the operator is able to produce a product with a ratio within the desired range and which will form an aqueous surfactant solution having a desired viscosity. The methods of making and using these aqueous surfactant solutions of desired and controlled viscosity will be apparent from the following discussion.

The digestion of unreacted gaseous $SO_3$ can be accomplished in any suitable means for creating intimate contact between the liquid effluent of the reactor and the unreacted sulphur trioxide. For example, the digester 25 could be a stirred hold-up tank or baffled transfer line between the reactor 12 and the neutralizer 15. Intimate contact may be maintained by agitation with a stirrer or turbulence as with the baffled transfer line. The period of time that the reactor product remains in the digester will depend upon, among other things, its viscosity, the internal volume of the digester and the mass flow rate of the reactor product through the digester. The mass flow rate should be controlled so that no gaseous $SO_3$ is present in the flow line leading to the neutralizer. In other words, the effluent from the reactor should remain in the digester for a sufficient period of time to permit any remaining gaseous $SO_3$ to react. Generally the temperature in the digester should be controlled so that it will be no higher than the maximum temperature in the reactor to avoid product degradation. The temperature in the digester, however, should be sufficiently high to avoid difficulties in handling the effluent from the reactor. For example, if the temperature drops too low a sludge phase containing highly viscous materials may settle out of the product which may cause plugging of the lines and fouling of the process tanks and pumps.

Table III illustrates the effect of digesting the unreacted gaseous $SO_3$ in the process of the manufacture of these surfactants and how the use of a digester can change the water-insoluble/pentane-insoluble ratio and the viscosity of an aqueous solution of these products. The viscosities of these surfactant solutions were determined in the manner set forth in the discussion of Table II.

TABLE III

| Example | Digester | Temperature. °F. | Treat ratio | Water-insoluble/pentane-insoluble ratio | Viscosity of surfactant solution in centipoises |
|---|---|---|---|---|---|
| I | No | 310 | 20 | .033 | 2.6 |
| II | Yes | 310 | 20 | .244 | 5.4 |

Comparing the two examples of Table III it will be seen that, with the temperature and treat ratio held constant, there is a variation in the viscosities of the surfactant solutions depending upon whether digestion of the unreacted gaseous $SO_3$ occurred in the processing of the product. No digester was employed in the preparation of the product of Example I. The ratio of the water-insoluble/pentane-insoluble sulfonates and the viscosity of the aqueous solutions of this product was relatively low. In Example II, a digester was used; the ratio and the viscosity of the aqueous solution of this product were higher.

Table IV illustrates the effect of a reactor temperature (measured at the reactor discharge) on the water-insoluble/pentane-insoluble ratio and the viscosities of aqueous solutions of the compositions. In the Examples illustrated in Table IV, the reactor temperature was varied while other conditions were held constant. As can be seen from Table IV, when the reactor temperature is increased, the water-insoluble/pentane-insoluble ratio also increased. There is also a corresponding increase in the viscosities of the aqueous solutions of these products. The viscosities of these solutions were measured in the manner previously described.

TABLE IV

| Example | Digester | Temperature. °F. | Treat ratio | Water-insoluble/pentane-insoluble ratio | Viscosity of surfactant solution in centipoises |
|---|---|---|---|---|---|
| I | Yes | 273 | 20 | .038 | 2.2 |
| II | do | 310 | 20 | .244 | 5.4 |

Table V illustrates the effect of changing the treat ratio with the other variables held approximately constant. As can be seen from this table as the treat ratio increases, the water-insoluble/pentane-insoluble ratio also increases as does the viscosity of the solutions of the products. Again, these viscosities were determined in the previously described manner. The Examples of Table V show how a product with a low ratio can be made satisfactory by adjustment of one of the process reaction conditions. Thus, when the treat ratio is increased from 15 to 20, the water-insoluble/pentane-insoluble ratio rises from a low level to within the desired range. It should also be noted that there is a concurrent increase in reaction temperature in the second Example. This slight increase in temperature, however, does not account for the large increase in the ratio and the viscosity.

TABLE V

| Example | Digester | Temperature. °F. | Treat ratio | Water-insoluble/pentane-insoluble ratio | Viscosity of surfactant solution in centipoises |
|---|---|---|---|---|---|
| I | No | 267 | 15 | .003 | 1.8 |
| II | do | 280 | 20 | .094 | 3.0 |

The viscosity levels which can be achieved in accordance with the teachings of this application will be low enough for satisfactory performance in all but rare and isolated instances. There will be operations, however, where the viscosity which is attributable to the surfactant is not high enough for an optimum displacement of the reservoir oil. Nevertheless, the teachings of this application can be beneficial even in these circumstances.

Other viscosity-increasing agents can be added to the surfactant solution to increase its viscosity if a higher viscosity is needed for a particular application. While the viscosity of a solution of the surfactant in and of itself may not be sufficient, the viscosity contribution of the surfactant can radically lower the quantity of additional viscosity-increasing agents which would otherwise be needed. For example, the viscosity of a surfactant solution prepared in accordance with the teaching of this application can be raised from a level of about 2 centipoises to 9 centipoises at a shear rate of 230 seconds by the addition of 400 p.p.m. of a heteropolysaccharide of the type disclosed in U.S. Pat. No. 3,305,016; Lindblom et al. Approximately twice this quantity of the heteropolysaccharide would have to be added to an aqueous solution to achieve the same viscosity level in the absence of the surfactant.

A typical operation in which this invention might be carried out is illustrated by the following example:

A petroleum reservoir is waterflooded in a conventional manner to a residual oil saturation of about 30 percent of the reservoir pore volume. Using standard reservoir techniques, it is determined that a solution containing approximately 2 weight percent surfactant and having a viscosity of approximately 3.0 centipoises at 230 reciprocal seconds could satisfactorily displace oil from this particular reservoir. A surfactant solution is prepared by reacting a petroleum feed stock boiling within the range of 700°–1,100° F. in a wiped film reactor. The reaction conditions of the process are adjusted by controlling the temperature of the reactor effluent at 280° F. and the treat ratio at 20 to produce a surfactant product having a water-insoluble/pentane-insoluble sulfonate ratio of approximately 0.09. The product is subsequently neutralized with sodium hydroxide, deoiled, concentrated and shipped to the field location. The surfactant mixture is added at a concentration of 2.0 weight percent based on the pentane-insoluble sulfonate concentration to water containing approximately 1 weight percent sodium carbonate. The viscosity of the resultant mixture is approximately 3 centipoises at 230 reciprocal seconds. The volume of the solution injected into the reservoir is approximately 30 percent of the reservoir pore volume within the area to be swept by the solution. The injected surfactant solution is followed by a 30 percent pore volume bank of flood water containing 0.04 weight percent of a heteropolysaccharide viscosity-increasing agent and having a viscosity of approximately 3 centipoises at a shear rate of 230 reciprocal seconds. The surfactant and thickened water banks are then displaced toward a producing well by injection of oil field brine. Displaced reservoir oil is recovered from the producing well.

The principle of the invention and the best mode in which it is contemplated to apply that principle have been described. It is to be understood that the foregoing is illustrative only and that other means and techniques can be employed without departing from the true scope of the invention defined in the following claims.

What is claimed is:

1. A method for recovering oil from a subterranean formation which comprises injecting into the formation an aqueous solution of a sulfonated hydrocarbon surfactant having a predetermined water-insoluble/pentane-insoluble sulfonate ratio, wherein said ratio is maintained between 0.01 and 0.30 by weight, displacing the surfactant solution through the formation, and recovering oil from the formation.

2. A method as defined by claim 1 further comprising adding viscosity increasing agent to the surfactant solution to further increase the viscosity of the solution.

3. A method as defined by claim 1 wherein the concentration of the pentane-insoluble sulfonate in the aqueous solution is about 2 weight percent.

4. A method as defined by claim 1 wherein the surfactant solution exhibits non-Newtonian fluid behavior.

5. A method as defined by claim 4 wherein the non-Newtonian fluid behavior is pseudo-plastic and thixotropic.

6. A method as defined by claim 1 wherein the volume of the surfactant solution is about 30 percent of the reservoir pore volume within the area to be swept by the surfactant solution.

7. A method as defined by claim 6 wherein the surfactant solution and the second aqueous solution containing the viscosity increasing agent are displaced through the formation by a third aqueous solution.

8. A method as defined by claim 1 wherein the surfactant solution is displaced through the formation by a second aqueous solution containing a viscosity increasing agent.

9. An improved method for recovering oil from a subterranean oil bearing formation by displacing the oil with an aqueous solution of a sulfonated hydrocarbon surfactant and recovering oil from the formation in which the improvement comprises determining a viscosity level for the aqueous surfactant solution to effectively displace the oil and injecting into the formation an aqueous solution of the sulfonated hydrocarbon surfactant having a water-insoluble/pentane-insoluble sulfonate ratio within the range of 0.01 to 0.30 by weight and at a ratio within the range sufficient to impart the determined viscosity to the surfactant solution.

10. A method for recovering oil from a subterranean formation comprising injecting into the formation an aqueous solution of a sulfonated hydrocarbon surfactant having a water-insoluble/pentane-insoluble sulfonate ratio within the range of 0.01 to 0.30 by weight and at a ratio in the range to produce a mobility ratio between the oil and surfactant solution which approaches 1.0, displacing the surfactant solution through the formation and recovering oil from the formation.

* * * * *